(12) United States Patent
Ooi

(10) Patent No.: US 8,525,865 B2
(45) Date of Patent: Sep. 3, 2013

(54) OPTICAL SCANNING APPARATUS AND IMAGE FORMING APPARATUS PROVIDED WITH THE SAME

(75) Inventor: Hironobu Ooi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 24 days.

(21) Appl. No.: 13/115,470

(22) Filed: May 25, 2011

(65) Prior Publication Data

US 2011/0292156 A1    Dec. 1, 2011

(30) Foreign Application Priority Data

May 28, 2010    (JP) ................... 2010-122526

(51) Int. Cl.
*B41J 2/47*    (2006.01)
*B41J 15/14*    (2006.01)
*B41J 2/435*    (2006.01)
*B41J 27/00*    (2006.01)

(52) U.S. Cl.
USPC ........... 347/260; 347/235; 347/241; 347/250; 347/256; 347/258; 347/259; 347/261

(58) Field of Classification Search
None
See application file for complete search history.

(56) References Cited

U.S. PATENT DOCUMENTS

| | | | |
|---|---|---|---|
| 4,829,322 A | 5/1989 | Ohmori | |
| 2002/0036683 A1 | 3/2002 | Yokoyama et al. | |
| 2004/0047017 A1* | 3/2004 | Ohno et al. | 359/204 |
| 2005/0001897 A1* | 1/2005 | Tanizaki et al. | 347/259 |

FOREIGN PATENT DOCUMENTS

| | | |
|---|---|---|
| JP | H10-239624 A | 9/1988 |
| JP | S63-300213 A | 12/1988 |
| JP | 2002-98920 A | 4/2002 |
| JP | 2002-148542 A | 5/2002 |

OTHER PUBLICATIONS

Machine Translation of JP 2002-98920A.
Machine Translation of JP 2002-148542A.
English Abstract of JP S63-300213A.
English Abstract of JP H10-239624A.
Communication dated Oct. 17, 2012 from a foreign patent office for a counterpart foreign application.

* cited by examiner

*Primary Examiner* — Matthew Luu
*Assistant Examiner* — Kendrick Liu

(57) ABSTRACT

An optical scanning apparatus includes a housing, light source, deflector, imaging lens, reflective mirrors, a synchronization detector and synchronization detection mirror. The housing has a plate to partition the housing. The deflector deflects a light beam emitted from the light source. The imaging lens converts the deflected light beam into a constant speed scanning light beam. The reflective mirrors reflect the constant speed scanning light beam to a photoreceptor. The synchronization detector detects timing for starting scanning of the photoreceptor. The synchronization detection mirror reflects the light beam to the synchronization detector. At least one of the reflective mirrors is disposed midway in a synchronization detection light path extending from the deflector to the synchronization detection mirror. The light beam reflected by the synchronization detection mirror is reflected again by at least one of the reflective mirrors, such that the light beam is guided to the synchronization detector.

7 Claims, 3 Drawing Sheets

OPTICAL SCANNING APPARATUS AND IMAGE FORMING APPARATUS PROVIDED WITH THE SAME

This application is based on and claims the benefit of priority from Japanese Patent Application No. 2010-122526, filed on 28 May 2010, the content of which is incorporated herein by reference.

BACKGROUND OF THE INVENTION

1. Field of the Invention

The present invention relates to an optical scanning apparatus that scans a photoreceptor optically and an image forming apparatus provided with the same.

2. Related Art

In an image forming apparatus such as a copier or printer and the like, a surface of a photoreceptor uniformly electrostatically charged by a charging device is optically scanned by an optical scanning apparatus, such that an electrostatic latent image corresponding to image information is formed on the surface of the photoreceptor. Thereafter, the electrostatic latent image is developed by a developing device using a toner as a developer, and visualized as a toner image. The toner image is transferred onto a sheet of paper by a transfer device, and then heated, pressurized and fixed onto the sheet of paper by a fixing device. Ejection of the sheet of paper onto which the toner image is fixed terminates a series of image forming operations.

An optical scanning apparatus that scans a photoreceptor and forms an electrostatic latent image on a surface of the photoreceptor is composed of: a light source; a deflector that deflects a light beam emitted from a light source; an imaging lens that converts the light beam deflected by the deflector into a constant speed scanning light beam; a reflective mirror that guides the constant speed scanning light beam back onto a photoreceptor; a synchronization detector that detects timing for commencement of scanning of the photoreceptor by the light beam; and a synchronization detection mirror that reflects the light beam to be guided to the synchronization detector, that are housed in a housing.

For downsizing and reinforcing such an optical scanning apparatus while maintaining a length of a light path required of an entire optical system, a configuration is proposed, for example. According to the configuration proposed, the housing is configured to be an H-shape with a plate and frame-like side walls surrounding the plate, and the deflector is disposed in a center of the plate. In addition, a plurality of optical components such as the imaging lens and the reflective mirror are allocated to upper and lower spaces inside the housing partitioned by the plate.

However, in the abovementioned configuration, the synchronization detector and the synchronization detection mirror are disposed in the lower space of the housing divided by the plate. Accordingly, a limitation occurs for a space where the synchronization detector and the synchronization detection mirror are disposed. Depending on the length of the light path of the optical system, there may be a problem that the housing is unable to accommodate the synchronization detector or a problem that the housing increases in size even if it succeeds in accommodating the synchronization detector.

In addition, in the abovementioned configuration, an increase in cost may occur as a result of introducing additional synchronization detection lenses and synchronization detection mirrors. Furthermore, a problem associated with faulty detection of synchronization may occur, which is due to positioning error of the synchronization detection lens and the synchronization detection mirror.

SUMMARY OF THE INVENTION

An objective of the present invention is to provide an optical scanning apparatus that secures a required length for a synchronization detection light path while avoiding an increase in cost and implementing downsizing. Also it is an object of the present invention to provide an image forming apparatus provided with such an optical scanning apparatus.

The present invention provides an optical scanning apparatus, which includes a housing, a light source housed in the housing, a deflector, an imaging lens, a plurality of reflective mirrors, a synchronization detector and a synchronization detection mirror. The housing has a plate configured to partition an inner space of the housing into an upper portion and a lower portion. The deflector is housed in the housing and configured to deflect a light beam emitted from the light source. The imaging lens is housed in the housing and configured to convert the light beam deflected by the deflector into a constant speed scanning light beam. The plurality of reflective mirrors is housed in the housing and configured to reflect the constant speed scanning light beam to be guided to a photoreceptor. The synchronization detector is housed in the housing and configured to detect timing at which scanning of the photoreceptor by the light beam is started. The synchronization detection mirror is housed in the housing and configured to reflect the light beam to be guided to the synchronization detector. At least one of the plurality of reflective mirrors is disposed midway in a synchronization detection light path extending from the deflector to the synchronization detection mirror. The light beam reflected by the synchronization detection mirror is reflected again by at least one of the plurality of reflective mirrors, such that the light beam is guided to the synchronization detector.

The present invention is configured such that at least one of the plurality of reflective mirrors is disposed midway in the synchronization detection light path extending from the deflector to the synchronization detection mirror, and the light beam reflected by the synchronization detection mirror is reflected again by at least one of the plurality of reflective mirrors such that the light beam is guided to the synchronization detector. Therefore, the present invention secures a required length for the synchronization detection light path, while not only avoiding introduction of additional synchronization detection lenses and synchronization detection mirrors and an increase in cost associated with the addition, but also maintaining compactness of the optical scanning apparatus.

DETAILED DESCRIPTION OF THE INVENTION

Exemplary embodiments of the present invention will now be described based on the drawings provided.

Image Forming Apparatus

Figure 1:
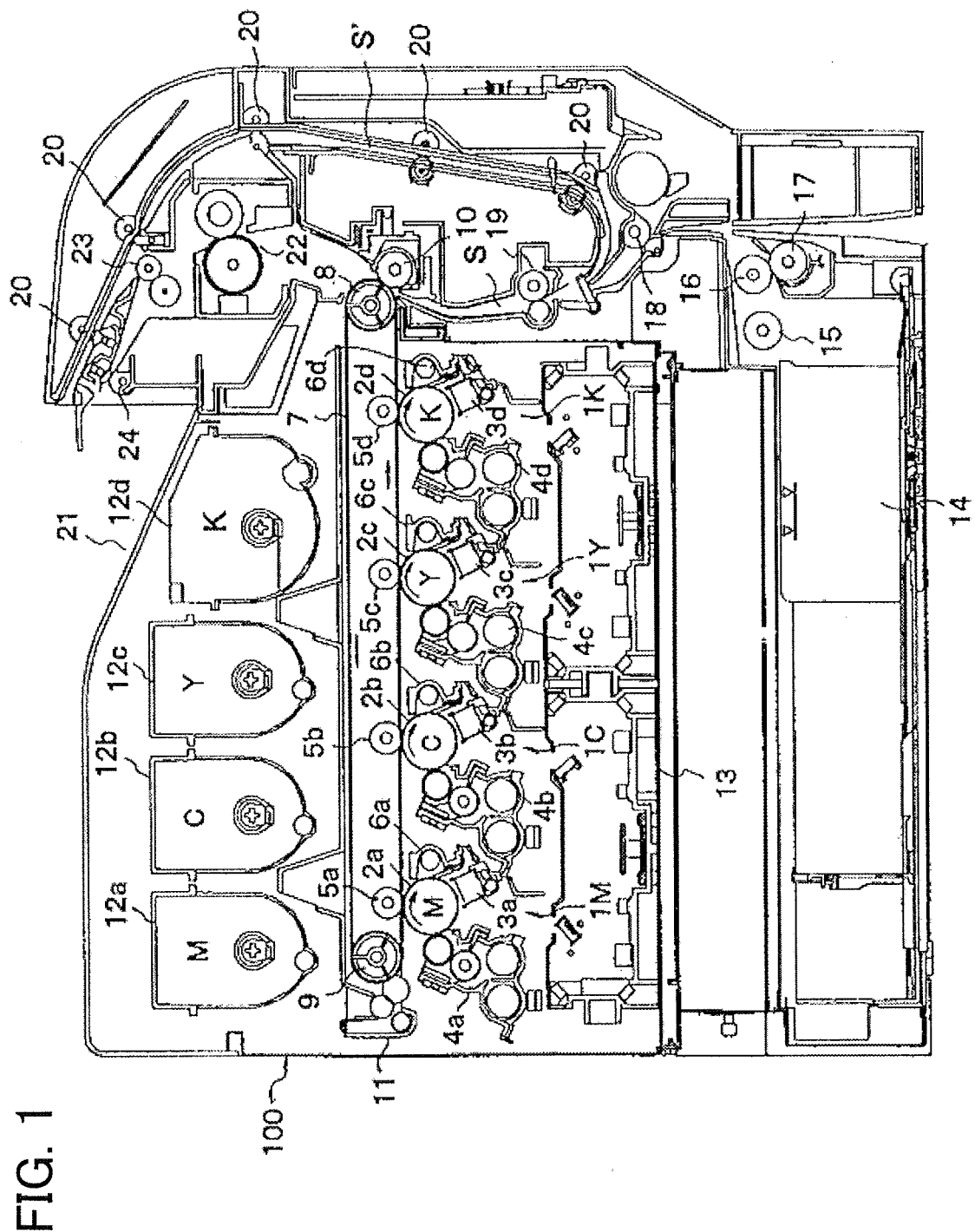
FIG. 1 is a sectional view of an image forming apparatus (color laser printer) according to an embodiment of the present invention.

FIG. 1 is a sectional view of a color laser printer as one embodiment of an image forming apparatus according to the present invention. The color laser printer depicted in FIG. 1 is a tandem-type apparatus. In a central portion inside a main body 100, a magenta image forming unit 1M, cyan image forming unit 1C, yellow image forming unit 1Y, and black image forming unit 1K are arranged in tandem at constant intervals.

In the abovementioned image forming units 1M, 1C, 1Y and 1K, photoreceptor drums 2a, 2b, 2c, and 2d, which are photoreceptors, are respectively disposed. Charging devices 3a, 3b, 3c, and 3d, developing devices 4a, 4b, 4c, and 4d, transfer rollers 5a, 5b, 5c, and 5d, and drum cleaning devices 6a, 6b, 6c, and 6d are each disposed in areas around each of the photoreceptor drums 2a, 2b, 2c and 2d.

Here, the photoreceptor drums 2a, 2b, 2c and 2d are drum-shaped photoreceptors. They are rotationally driven by a drive motor, not shown, at a predetermined processing speed in a direction of arrows (clockwise direction) in the drawing. Also, the charging devices 3a to 3d uniformly charge surfaces of the photoreceptor drums 2a-2d, respectively, to a predetermined potential using a charged bias charged from charging bias power supply, not shown.

The developing devices 4a, 4b, 4c and 4d respectively store toners of magenta (M), cyan (C), yellow (Y) and black (K). The developing devices 4a, 4b, 4c and 4d each deposit toner of each color on an electrostatic latent image formed on each of the photoreceptor drums 2a, 2b, 2c and 2d, thereby visualizing the electrostatic latent image as a toner image of each color.

Also, the transfer rollers 5a-5d are disposed in contact with the photoreceptor drums 2a-2d via an intermediate transfer belt 7 interposed therebetween, at each primary transfer portion. The intermediate transfer belt 7 is trained between a drive roller 8 and tension roller 9, running along an upper side of photoreceptor drums 2a-2d. The drive roller 8 is disposed in contact with a secondary transfer roller 10 via the intermediate transfer belt 7 interposed therebetween, at a secondary transfer portion. Also, a belt cleaning device 11 is disposed near the tension roller 9.

Toner containers 12a, 12b, 12c, and 12d are disposed in line with each other to refill toner to developers 4a-4d, respectively, above each image forming unit 1M, 1C, 1Y, and 1K in the printer main unit 100.

Also, two optical scanning apparatuses 13 are disposed in parallel with each other along a paper conveyance direction below each image forming unit 1M, 1C, 1Y, and 1K in the printer main unit 100. In a bottom portion of the printer main body 100, below the optical scanning apparatuses 13, a paper feeding cassette 14 is detachably disposed. A plurality of sheets of paper, not shown, is stacked and stored in the paper cassette 14. A pickup roller 15 that kicks out a sheet of paper from the paper cassette 14, a feed roller 16 and a retard roller 17 that separate the sheet of paper kicked out and feed it on a one by one basis to a conveyance path S are disposed near the paper cassette 14.

Also, a pair of conveyance rollers 18 that conveys the sheet of paper and a pair of resist rollers 19 are disposed in the conveyance path S that extends in up and down directions of the printer main unit 100. The pair of resist rollers 19 causes the sheet of paper to temporarily wait and supplies it at predetermined timing to the secondary transfer portion, where the drive roller 8 is in contact with the secondary transfer roller 10. Adjacent to the paper path S, another paper path S' used for duplex printing is formed. In the paper path S', a plurality of pairs of reversing rollers 20 is provided at appropriate intervals.

The conveyance path S disposed in a longitudinal direction on one side of the printer main unit 100 extends up to a discharge tray 21 disposed at a top surface of the printer main unit 100. A fixing device 22 and pairs of paper ejection rollers 23 and 24 are provided midway in the paper path S.

Image forming operations using a color laser printer having the abovementioned configuration will now be described.

When a signal instructing a start of image forming is issued, each photoreceptor drum 2a-2d is rotationally driven at a predetermined processing speed in a direction of arrows (clockwise direction) shown in FIG. 1, in each image forming unit 1M, 1C, 1Y, and 1K. These photoreceptor drums 2a-2d are uniformly charged by the charging devices 3a-3d. Furthermore, each optical scanning apparatus 13 emits a light beam modulated according to a color image signal of each color, irradiating the light beam onto a surface of each photoreceptor drum 2a-2d. As a result, on each photoreceptor drum 2a-2d, an electrostatic latent image that corresponds to the color image signal of each color is formed.

The developer 4a charged with a developer bias having the same polarity as the charged polarity of the photoreceptor drum 2a attaches magenta toner to an electrostatic latent image formed on the photoreceptor drum 2a of the magenta image forming unit 1M. This visually develops the electrostatic latent image as a magenta toner image. This magenta toner image is primarily transferred by an effect applied by the transfer roller 5a charged with a primary transfer bias of a polarity opposite to that of the toner at the primary transfer portion (transfer nipping portion) between the photoreceptor drum 2a and transfer roller 5a onto the intermediate transfer belt 7, which is rotationally driven in a direction of an arrow shown in FIG. 1.

The intermediate transfer belt 7 onto which the magenta toner image is primarily transferred as described above moves on to the cyan image forming unit 1C. Similarly as described above, at the cyan image forming unit 1C, the cyan toner image formed on the photoreceptor drum 2b is transferred onto the intermediate transfer belt 7 overlapping with the magenta toner image at the primary transfer portion.

In the same way, yellow and black toner images each formed on photoreceptor drums 2c and 2d of the yellow and black image forming units 1Y and 1K are formed sequentially overlapping with magenta and cyan toner images on the intermediate transfer belt 7. In this way, a full-color toner image is formed on the intermediate transfer belt 7. Residual transfer toner on each photoreceptor drum 2a-2d that is not transferred to the intermediate transfer belt 7 is removed by each drum cleaning device 6a-6d. Then, each photoreceptor drum 2a-2d is ready for forming a next image.

The sheet of paper, which is fed from the paper feeding cassette 14 into the paper path S by the pick-up roller 15, the feeding roller 16 and the retarding roller 17, is fed to the secondary transfer portion by the pair of resist rollers 19. Feeding of the sheet of paper to the secondary transfer portion is performed while synchronized with a timing at which a front end of the full-color toner image on the intermediate transfer belt 7 reaches the secondary transfer portion (transfer nip portion) between the drive roller 8 and the secondary transfer roller 10. The full-color toner image is secondarily transferred by the secondary transfer roller 10 collectively from the intermediate transfer belt 7 to the sheet of paper conveyed to the secondary transfer portion. The secondary transfer roller 10 is charged with a secondary transfer bias having a polarity opposite to that of the toner.

Next, the paper transferred with the full-color toner image is conveyed to the fixing device 22. The full-color toner image is fixed onto a surface of the sheet of paper by heating and pressurizing. The sheet of paper onto which the toner image is fixed is then discharged by the pairs of discharge rollers 23, 24 to the discharge tray 21. A series of image forming operations is thus completed. Untransferred toner remaining on the intermediate transfer belt 7 that is not transferred to the sheet of paper is removed by the belt cleaning device 11. Accordingly, the intermediate transfer belt 7 is ready for forming a next image.

Optical Scanning Apparatus

Figure 2:
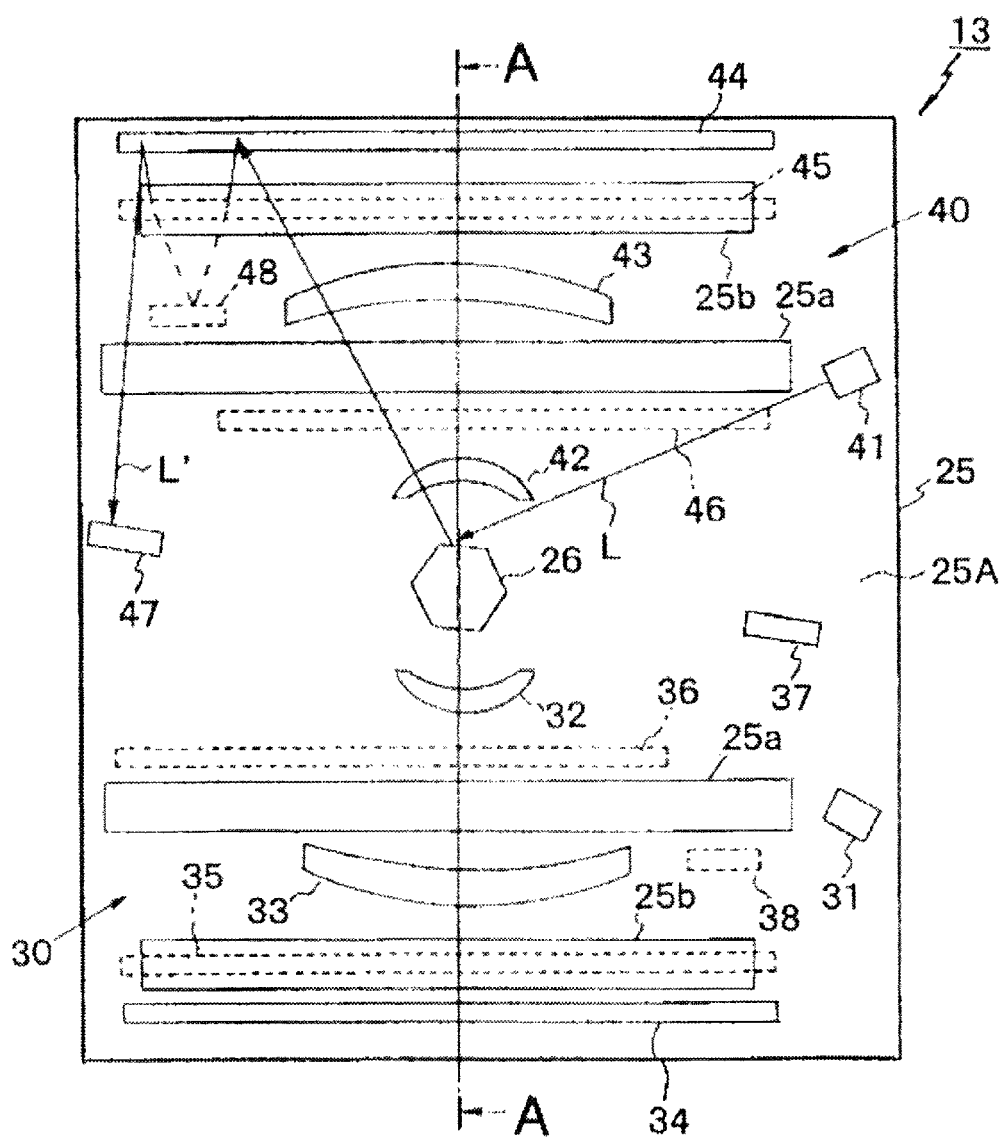
FIG. 2 is a diagram showing an internal structure of the optical scanning apparatus according to the present invention.
Figure 3:
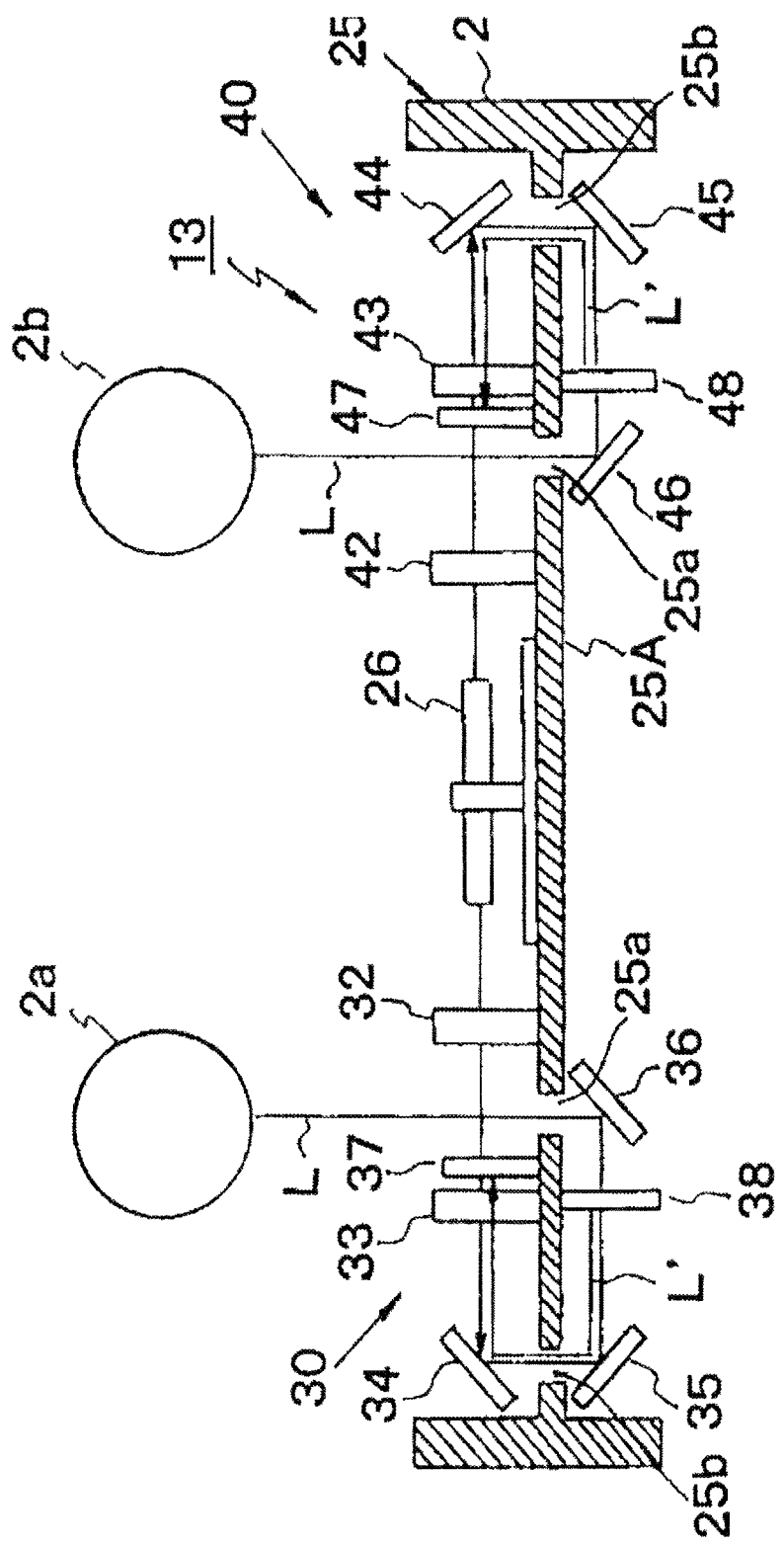
FIG. 3 is a cross-sectional view taken along a line A-A of FIG. 2.

An optical scanning apparatus 13 according to the present invention will now be explained with reference to FIGS. 2 and 3. FIG. 2 is a diagram showing an internal structure of the optical scanning apparatus according to the present invention. FIG. 3 is a cross-sectional view taken along a line A-A of FIG. 2. It should be noted that, since the two optical scanning apparatuses 13 provided in the color laser printer shown in FIG. 1 have the same configuration, one of the optical scanning apparatuses 13 is described hereinafter.

The optical scanning apparatus 13 has a housing 25 composed of integral molding of plastics. As shown in FIG. 3, the housing 25 has an H-shape in a lateral sectional view, with a horizontal plate 25A that partitions vertically an inside of the housing 25, and frame-like side walls 25B surrounding the plate 25A. A polygon mirror 26 serving as a deflector is disposed at a central portion on a top surface of the plate 25A of the housing 25. In upper and lower space of the housing 25 partitioned by the plate 25A, two scanning optical systems 30, 40 are disposed symmetrically on both sides of the polygon mirror 26.

The scanning optical systems 30, 40 are provided with laser diodes 31, 41 of light sources, which are disposed on the top surface of the plate 25A inside the housing 25. The laser diodes 31, 41 have collimator lenses mounted (not illustrated).

A light beam L that is emitted from each of the laser diodes 31, 41 is converged into a linear luminous flux by the collimator lenses (not illustrated). Subsequently, light beams L converged enter from two symmetrical directions with respect to the polygon mirror 26 that is rotationally driven at a predetermined speed. Each light beam L incident to the polygon mirror 26 is deflected by the polygon mirror 26. On a side closer to the top surface of the plate 25A, a scanning optical system 30 (40) has first imaging lens 32 (42), second imaging lens 33 (43) and first reflective mirror 34 (44), which are aligned with a direction in which the light beam L travels. In addition, on a side closer to a bottom surface of the plate 25A, the scanning optical system 30 (40) has second reflective mirror 35 (45) and third reflective mirror 36 (46), which are aligned with the direction in which the light beam L travels.

Incidentally, as shown in FIGS. 2 and 3, one optical scanning apparatus 13 performs exposure scanning of the photoreceptor drum 2a of the magenta image forming unit 1M and the photoreceptor drum 2b of the cyan image forming unit 1C shown in FIG. 1. A first opening 25a is formed between the first imaging lens 32 (42) and the second imaging lens 33 (43) on a light path extending from the third reflective mirror 36 (46) to the photoreceptor drum 2a (2b) composing the scanning optical system 30 (40). A second opening 25b is formed on a light path extending from the first reflective mirror 34 (44) to the second reflective mirror 35 (45) of the plate 25A.

Meanwhile, as shown in FIG. 2, in the scanning optical systems 30, 40, synchronization detectors (BD sensors) 37, 47 are disposed diagonally with respect to the second imaging lenses 33, 43 on the plate 25A, respectively, and symmetrically with each other about the polygon mirror 26. The synchronization detector 37 (47) is disposed outside an effective scanning range of the photoreceptor drum 2a (2b) performed by the light beam L. The synchronization detector 37 (47) detects an optical beam L' for synchronization detection and determines timing at which exposure scanning (writing) performed by the optical beam L on the photoreceptor drum 2a (2b) is started.

In addition, in the scanning optical systems 30, 40, synchronization detection mirrors 38, 48 are respectively disposed on the bottom surface of the plate 25A, outside the effective scanning ranges (symmetrically with each other about the polygon mirror 26). The synchronization detection mirror (48) reflects the light beam L' for synchronization detection, causing it to be guided to the synchronization detector 37 (47).

In addition, in the present embodiment, the first reflective mirror 34 (44) and the second reflective mirror 35 (45) are disposed midway in a synchronization detection light path extending from the polygon mirror 26 to the synchronization detection mirror 38 (48). Furthermore, the first imaging lens 32 (42) and the second imaging lens 33 (43) are disposed midway in the synchronization detection light path extending from the polygon mirror 26 to the first reflective mirror 34 (44).

Also, light beams L that are emitted from the laser diodes 31, 41 respectively disposed in the scanning optical systems 30, 40 in one optical scanning apparatus 13 are converged into linear luminous fluxes by the collimator lenses (not illustrated), and enter the polygon mirror 26 that is rotationally driven at a predetermined speed, from two directions symmetrical with each other.

Each light beam L incident to the polygon mirror 26 as described above is deflected by the polygon mirror 26 and passes through the first imaging lens 32 (42) and the second imaging lens 33 (43), such that it is converted into a constant speed scanning light beam L. Subsequently, the constant speed scanning light beam L is reflected downward by the first reflective mirror 34 (44) at a right angle. The constant speed scanning light beam L passes through the second opening 25b formed in the plate 25A to reach the second reflective mirror 35 (45). Subsequently, it is reflected at a right angle by the second reflective mirror 35 (45) to travel horizontally along the bottom surface of the plate 25A. Thereafter, the constant speed scanning light L is reflected upward at a right angle by the third reflective mirror 36 (46) to pass through the first opening 25a formed in the plate 25A, such that it travels toward the photoreceptor drum 2a (2b), and performs exposure scanning of the photoreceptor drum 2a (2b).

As shown in FIGS. 2 and 3, one optical scanning apparatus 13 performs exposure scanning of the photoreceptor drum 2a of the magenta image forming unit 1M and the photoreceptor drum 2b of the cyan image forming unit 1C shown in FIG. 1. Two optical scanning apparatuses 13 are juxtaposed in the color laser printer shown in FIG. 1. These two optical scanning apparatuses 13 perform exposure scanning by the light beams L for all four photoreceptor drums 2a-2d, including the photoreceptor drums 2c and 2d of the yellow image forming unit 1Y and the black image forming unit 1K.

The light beam L' for synchronization detection deflected by the polygon mirror 26 passes through the first imaging lens (42) and the second imaging lens 33 (43) such that it is narrowed. Subsequently, the light beam L' is reflected downward at a right angle by the first reflective mirror 34 (44). The light beam L' passes through the second opening 25b formed in the plate 25A to reach the second reflective mirror 35 (45). Subsequently, the light beam L is reflected at a right angle by the second reflective mirror 35 (45) to travel horizontally along the bottom surface of the plate 25A to reach the synchronization detection mirror 38 (48). The light beam L' is then reflected by the synchronization detection mirror 38 (48) to reach the second reflective mirror 35 (45), and reflected again by the second reflective mirror 35 (45) upward at a right angle. The light beam L' then passes through the second opening 25b formed in the plate 25A, and reaches again the first reflective mirror 34 (44).

The light beam L' is reflected at a right angle by the first reflective mirror 34 (44) to travel in parallel with the top surface of the plate 25A and is guided toward the synchronization detector 37 (47), which detects the light beam L'. With the operation described above, timing at which exposure scanning (writing) by the optical beam L for the photoreceptor drum 2a (2b) is determined. It is noted that in the present embodiment, the length of the synchronization detection light path extending from the polygon mirror 26 to the synchronization detector 37 (47) is adjusted to be substantially equal to the length of the scanning light path extending from the polygon mirror 26 to the photoreceptor drum 2a (2b), as shown in FIG. 3.

As described above, the present embodiment is configured: The first reflective mirror 34 (44) and the second reflective mirror 35 (45) are disposed midway in the synchronization detection light path extending from the polygon mirror 26 to the synchronization detection mirror 38 (48). And the light beam L' reflected by the synchronization detection mirror 38 (48) is reflected again by the second reflective mirror 35 (45) and the first reflective mirror 34 (44) and guided to the synchronization detector 37 (47). Therefore, the present embodiment secures a required length for a synchronization detection light path with a compact configuration, while avoiding not only additional synchronization detection lenses and synchronization detection mirrors but also a resulting increase in cost. Especially, the present embodiment implements downsizing of the housing 25 as a result of arranging the synchronization detector 37 (47) and the synchronization detection mirror 38 (48) separately with each other upward and downward with respect the plate 25A.

In addition, the present embodiment increases performance of synchronization detection. This is achieved by the feature of the present embodiment that the light beam L' for synchronization detection deflected by the polygon mirror 26 passes through the first imaging lens 32 (42) and the second imaging lens 33 (43) so as to be narrowed, before being reflected by the first reflective mirror 34 (44).

Furthermore, in the present embodiment, the synchronization detectors 37, 47 and the synchronization detection mirrors 38, 48 are not disposed on the side walls 25B that may be susceptible to thermal damage but on the plate 25A that is robust structurally of the housing 25. Therefore, the present embodiment prevents displacement related to the synchronization detector 37 (47) and the synchronization detection mirror 38 (48), increasing the accuracy of synchronization detection.

Moreover, in the present embodiment, the length of the synchronization detection light path extending from the polygon mirror 26 to the synchronization detector 37 (47) is adjusted to be substantially equal to the length of the scanning light path extending from the polygon mirror 26 to the photoreceptor drum 2a (2b). Accordingly, in the present embodiment, it is possible that the synchronization detector 37 (47) is disposed substantially corresponding to a scanned surface of the photoreceptor drum 2a (2b). Therefore, the present embodiment does not require additional synchronization detection lenses and synchronization detection mirrors, thereby implementing a reduction in cost and downsizing of the optical scanning apparatus 13.

The embodiment has been described above in which the present invention is applied to a color laser printer and an optical scanning apparatus provided therein; however, the present invention is not limited thereto. The present invention can be similarly applied to other arbitrary types of image forming apparatuses than a color printer, and an optical scanning apparatus provided therein.

What is claimed is:

1. An optical scanning apparatus, comprising:
   a housing having a plate configured to partition an inner space of the housing into an upper portion and a lower portion;
   a light source housed in the housing;
   a deflector housed in the housing and configured to deflect a light beam emitted from the light source;
   an imaging lens housed in the housing and configured to convert the light beam deflected by the deflector into a constant speed scanning light beam;
   a plurality of reflective mirrors housed in the housing and configured to reflect the constant speed scanning light beam to be guided to a photoreceptor;
   a synchronization detector housed in the housing and configured to detect timing at which scanning of the photoreceptor by the light beam is started; and
   a synchronization detection mirror housed in the housing and configured to reflect the light beam to be guided to the synchronization detector,
   wherein at least one of the plurality of reflective mirrors is disposed midway in a synchronization detection light path extending from the deflector to the synchronization detection mirror,
   wherein the light beam reflected by the synchronization detection mirror is reflected again by at least one of the plurality of reflective mirrors, such that the light beam is guided to the synchronization detector,
   wherein the synchronization detector and the synchronization detection mirror are disposed on the plate, and
   wherein the synchronization detector is disposed on one side of the plate closer to the deflector, and the synchronization detection mirror is disposed on the other side opposite to the one side of the plate.

2. The optical scanning apparatus according to claim 1, wherein the imaging lens is disposed midway in the synchronization detection light path.

3. An image forming apparatus comprising the optical scanning apparatus according to claim 1.

4. An optical scanning apparatus, comprising:
   a housing having a plate configured to partition an inner space of the housing into an upper portion and a lower portion;
   a light source housed in the housing;
   a deflector housed in the housing and configured to deflect a light beam emitted from the light source;
   an imaging lens housed in the housing and configured to convert the light beam deflected by the deflector into a constant speed scanning light beam;
   a plurality of reflective mirrors housed in the housing and configured to reflect the constant speed scanning light beam to be guided to a photoreceptor;
   a synchronization detector housed in the housing and configured to detect timing at which scanning of the photoreceptor by the light beam is started; and
   a synchronization detection mirror housed in the housing and configured to reflect the light beam to be guided to the synchronization detector, wherein at least one of the plurality of reflective mirrors is disposed midway in a synchronization detection light path extending from the deflector to the synchronization detection mirror, wherein the light beam reflected by the synchronization detection mirror is reflected again by at least one of the plurality of reflective mirrors, such that the light beam is guided to the synchronization detector, wherein the synchronization detection light path extending from the deflector to the synchronization detector comprises a length substantially equal to a length of a scanning light path extending from the deflector to the photoreceptor, and wherein the synchronization detector is disposed on one side of the plate closer to the deflector, and the synchronization detection mirror is disposed on the other side opposite to the one side of the plate.

5. The optical scanning apparatus according to claim 4, wherein the imaging lens is disposed midway in the synchronization detection light path.

6. The optical scanning apparatus according to claim 4, wherein the synchronization detector and the synchronization detection mirror are disposed on the plate.

7. An image forming apparatus comprising the optical scanning apparatus according to claim 4.

* * * * *